United States Patent [19]
Steffes

[11] 3,921,685
[45] Nov. 25, 1975

[54] SEALING MATERIAL INJECTOR NOZZLE

[75] Inventor: Robert J. Steffes, Windsor, Canada

[73] Assignee: General Motors Corporation, Detroit, Mich.

[22] Filed: July 24, 1974

[21] Appl. No.: 491,336

[52] U.S. Cl. ............................. 141/310; 141/392
[51] Int. Cl.² ............................................ B65B 3/04
[58] Field of Search .......... 141/300, 299, 286, 310, 141/309, 392; 222/566

[56] References Cited
UNITED STATES PATENTS

| | | |
|---|---|---|
| 951,843 | 3/1910 | Richards et al. .................. 141/300 |
| 1,325,991 | 12/1919 | King ............................. 141/286 X |
| 2,724,535 | 11/1955 | Day et al. ....................... 141/286 X |
| 3,204,670 | 9/1965 | Brennecke et al. ................ 141/286 |

FOREIGN PATENTS OR APPLICATIONS 459,356    9/1913    France .............................. 141/299

Primary Examiner—Robert B. Reeves
Assistant Examiner—Charles A. Marmor
Attorney, Agent, or Firm—Ronald L. Phillips

[57] ABSTRACT

An injector nozzle for injecting sealing material into an endless sealing space between two assembled parts wherein the nozzle has an outlet that directs the sealing material in one direction into the sealing space, a dam that prevents flow in the opposite direction, and a vent in the exterior thereof that vents the sealing space ahead of the flowing sealing material.

1 Claim, 3 Drawing Figures

SEALING MATERIAL INJECTOR NOZZLE

This invention relates to a sealing material injector nozzle and more particularly to such a nozzle that both injects sealing material and vents the space into which the sealing material is being injected.

In the art of sealing endless joints with injected sealing material while the parts are in their assembled condition, the avoidance of air entrapment which is deleterious to good sealing is of utmost importance. Heretofore, it has been common practice to employ several feed holes and/or bleed holes to avoid air entrapment. However, their provision adds cost and can complicate the injection process.

According to the present invention, there is provided an injector nozzle that requires only a single feed hole to inject the sealing material into the endless sealing space in an assembled joint and also vent this space. This is accomplished by forming a nozzle with an outlet that is faceable to direct the sealing material in one direction into the endless sealing space with this same end of the nozzle also having a dam that prevents the seal material from also being directed in the opposite direction into the endless sealing space. In addition, the nozzle has a vent passage formed in the exterior thereof on the side of the dam opposite the outlet with this vent passage extending longitudinally of the nozzle outwardly from the endless sealing space through the injection hole in the assembled joint to vent the endless sealing space ahead of the sealing material being injected.

An object of the present invention is to provide a new and improved sealing material injector nozzle.

Another object is to provide an injector nozzle that injects sealing material through a single hole into an endless sealing space between two parts in an assembled joint with this nozzle also acting to prevent the sealing material from flowing in the other direction while venting the endless sealing space ahead of the sealing material being injected.

Another object is to provide a sealing material injector nozzle having an outlet for directing the sealing material in one direction into an endless sealing space, a dam for preventing the sealing material from being directed in the opposite direction into the endless sealing space and further having a vent which vents the endless sealing space outward of the assembly ahead of the sealing material being injected.

These and other objects of the present invention will become more apparent from the following description and drawing in which.

Figure 1:
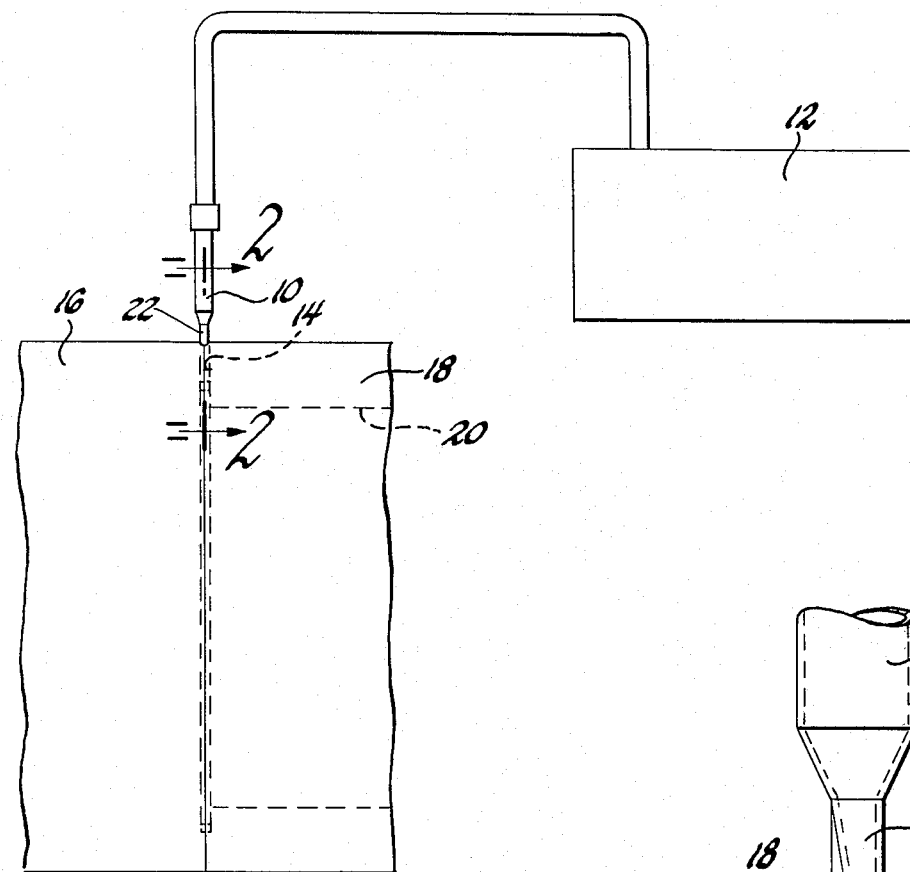
FIG. 1 shows a sealing material injector nozzle according to the present invention in use.

Referring to FIG. 1, there is shown a sealing material injector nozzle 10 constructed according to the present invention for use in injecting sealing material supplied under pressure from a supply 12 into an endless continuous annular sealing space 14 at the juncture of two assembled parts such as parts 16 and 18 to provide a seal between these parts about, for example, a cylinder 20 in part 18. While the particular assembled device is not important to understanding the present invention, it will be appreciated that these parts could be, for example, the intermediate or end housing and rotor housing in a rotary engine, in which case the seal to be formed would follow the required circuitous path to also seal all the various passages through both parts that convey oil and coolant; but in any event, the sealing space to be sealed would be continuous and endless.

Figure 2:
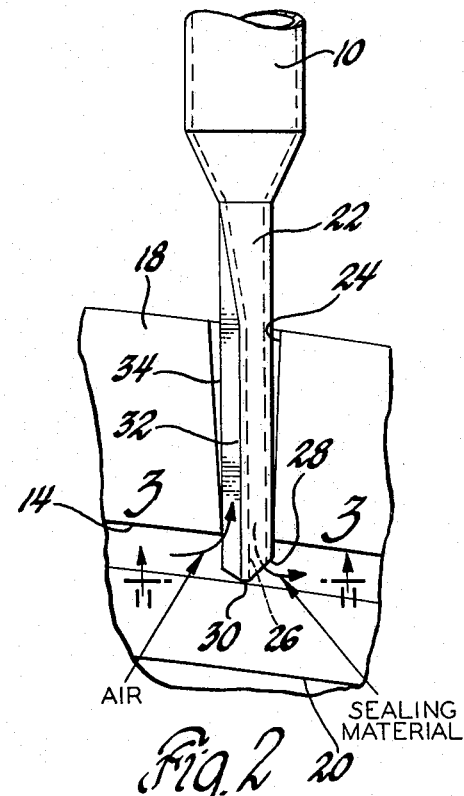
FIG. 2 is an enlarged view taken along the line 2—2 in FIG. 1.
Figure 3:
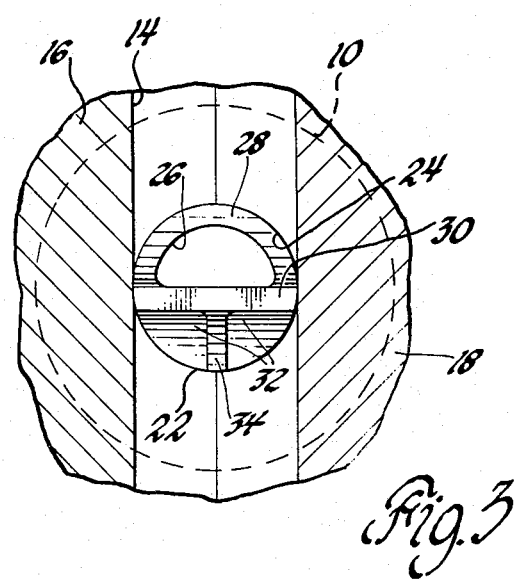
FIG. 3 is an enlarged view taken along the line 3—3 in FIG. 2.

As best shown in FIGS. 2 and 3, the nozzle 10 has a cylindrical insertion portion 22 that is insertable with a close fit into a nozzle receiving hole 24 that is bored or otherwise formed in the assembled joint and meets with the endless sealing space 14 which in this case is rectangular in cross-section. The injection end of the cylindrical portion 22 has a semi-circular outlet 26 formed therein as best shown in FIG. 3 which is faceable to direct the sealing material in one direction into the sealing space 14 as shown in FIG. 2, the outlet 26 being provided with an angled face 28 formed on the end of the cylindrical portion 22 to provide this flow direction. In addition, the injecting end of the cylindrical portion 22 has a diametrically extending dam 30 that spans the width of the sealing space when the outlet 26 is facing in the proper direction to prevent the sealing material from being directed in the opposite direction into the sealing space. Furthermore, the cylindrical portion 22 has one or more vent passages 32 formed in the exterior of the cylindrical portion 22 on the side of the dam 30 opposite the outlet 26. The vent passages 32 extend longitudinally of the nozzle from the sealing space 14 past the assembled parts 16 and 18 to thus provide separate vent passages in the nozzle receiving hole 24 to vent the sealing space ahead of the sealing material being injected. In the case of the two vent passages 32 shown, they have a triangular shaped cross-section with a longitudinally extending rib 34 therebetween that extends radially from the dam 30 and operates in the nozzle receiving hole 24 to center the nozzle therein.

In operation, with the injector nozzle properly positioned, a sealing material suited to the particular use is directed out the outlet 26 in the one direction into the annular space 14. The sealing material fills the cross-section of the sealing space 14 and as it moves therealong it drives the air ahead of it while the dam 30 prevents the sealing material from flowing in the opposite direction. The air ahead of the sealing material is vented by the vent passages 32 and eventually when this sealing material arrives at the vent passages, it then proceeds outwardly thereof and indicates to the operator that the sealing space has in fact been completely filled with sealing material.

The above described embodiment is illustrative of the invention which may be modified within the scope of the appended claims.

I claim:

1. An injector nozzle for filling an endless annular sealing space of predetermined cross-sectional area between two parts in an assembly with a sealing material through a cylindrical nozzle receiving hole provided in the assembly that intersects with the endless annular sealing space, said nozzle insertable at one end into the nozzle receiving hole in the assembly, said one end having an outlet that is faceable to direct the sealing material in one direction into the endless annular sealing space, said one end also having a dam of a configuration and cross-sectional area corresponding to that of the endless annular sealing space that is effective to close off the endless annular sealing space when the outlet is facing in said one direction to prevent the injected sealing material from also being directed in the opposite direction into the endless annular sealing space, and said nozzle having a vent passage in the exterior thereof on the side of said dam opposite said outlet and extending longitudinally of said nozzle outwardly from the endless annular sealing space past the assembly to provide a separate vent passage in said nozzle receiving hole to vent the endless annular sealing space ahead of the sealing material being injected.

* * * * *